March 21, 1967 W. C. STETTER 3,309,917
TENSILE TESTING APPARATUS
Filed April 30, 1964 3 Sheets-Sheet 3
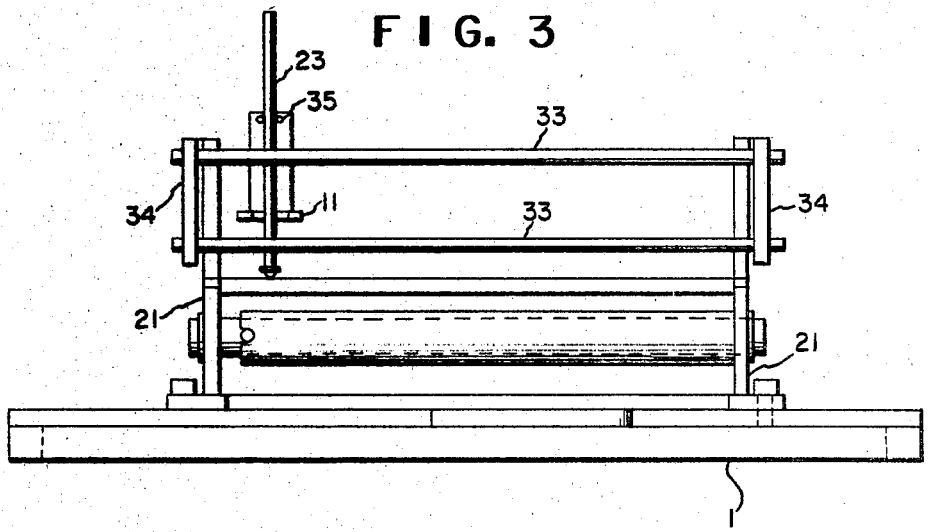
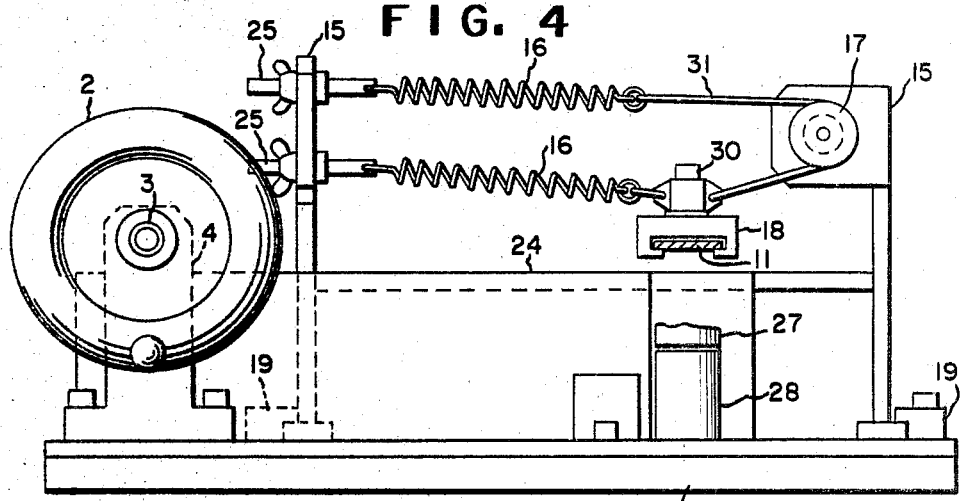
INVENTOR
WALTER CHARLES STETTER
BY Robert W Black
ATTORNEY 3,309,917
TENSILE TESTING APPARATUS
Walter C. Stetter, New Castle, Del., assignor to E. I. du Pont de Nemours and Company, Wilmington, Del., a corporation of Delaware
Filed Apr. 30, 1964, Ser. No. 363,695
6 Claims. (Cl. 73—89)

This invention relates to testing apparatus and more particularly to non-electrical testing apparatus which elongates materials and records the stress-strain or force-deformation curve of a sample of material being tested.

Previous to this invention, instruments used to obtain stress-elongation curves for materials were standard devices such as an Instron or certain models of Scott Testers. A Scott Tester may be a mechanical, motor driven testing apparatus which records the stress-strain curve of samples of material elongated thereon and this is accomplished by mechanically linking the recording assembly to the stressing mechanism of the instrument. An Instron device is an electro-mechanical apparatus which elongates samples of materials and through an amplifier and recording device automatically records on a chart the stress-strain curve of the material being tested. Most standard test equipment are expensive, large and cumbersome, difficult to use and maintain, and intricate in design.

The instrument of this invention is small, light weight, compact, relatively inexpensive, easy to operate, and records results with reasonable accuracy. The instrument of the invention can be used in the laboratory, at a bench scale process, and in a production process for rapid measurements of materials as they are prepared. This feature of the device is desirable especially where it is necessary or desirable to effect immediate adjustments on process conditions.

It is an object of this invention to provide a simple device for measuring the strength of materials.

It is a further object of this invention to provide a device of simple construction which will measure the strength of material being tested and record a stress-strain or force-deformation curve of the material with reasonable accuracy. These and other objects will appear hereinafter.

These and other important objects and advantages of the invention will become apparent as the same is more fully understood from the following description, which, taken in connection with the accompanying drawings, discloses preferred embodiments of the invention wherein:

FIGURE 3 is an end view of the apparatus from the chart end; and

FIGURE 4 is an end view of the apparatus from the hand crank end showing the spring arrangement.

Figure 1:
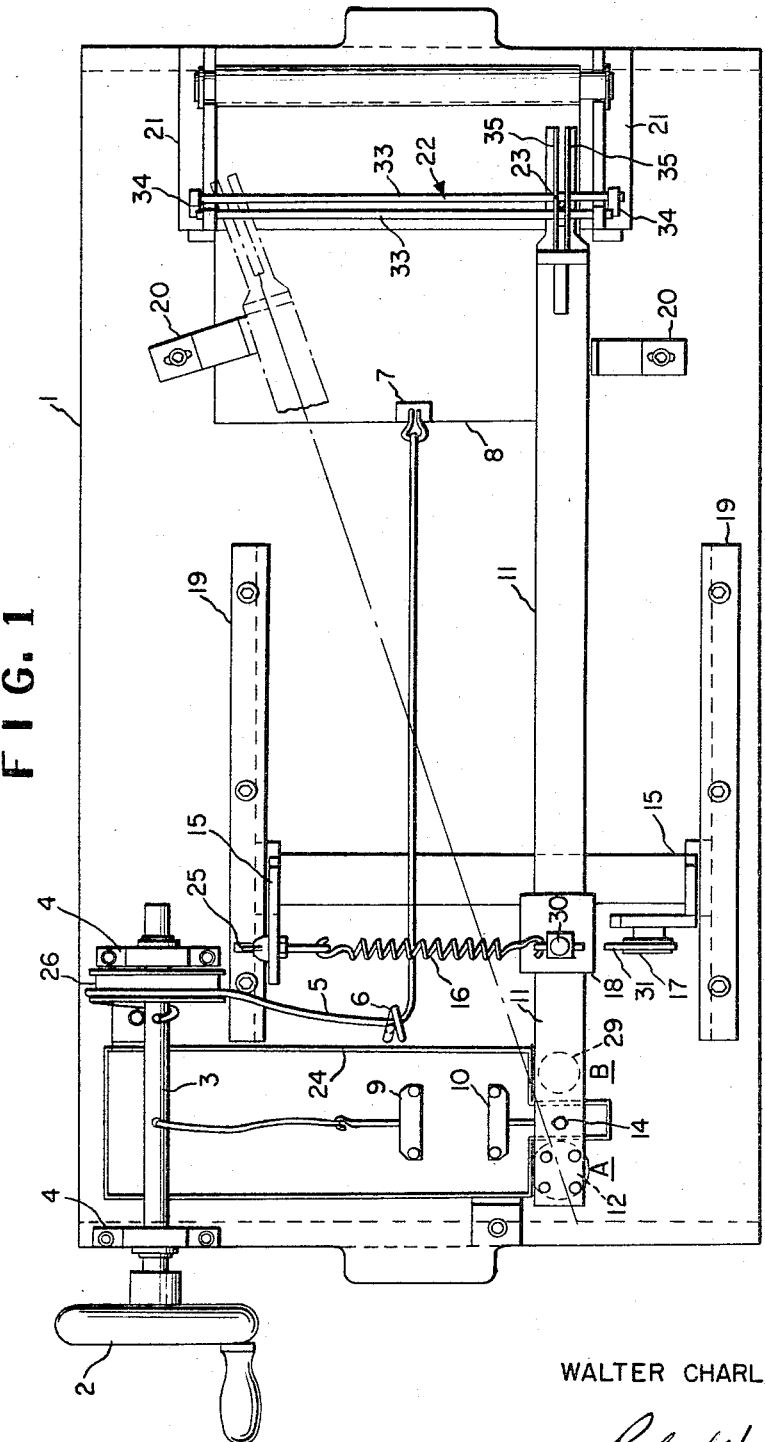
FIGURE 1 is a plan view of the apparatus of the invention.
Figure 2:
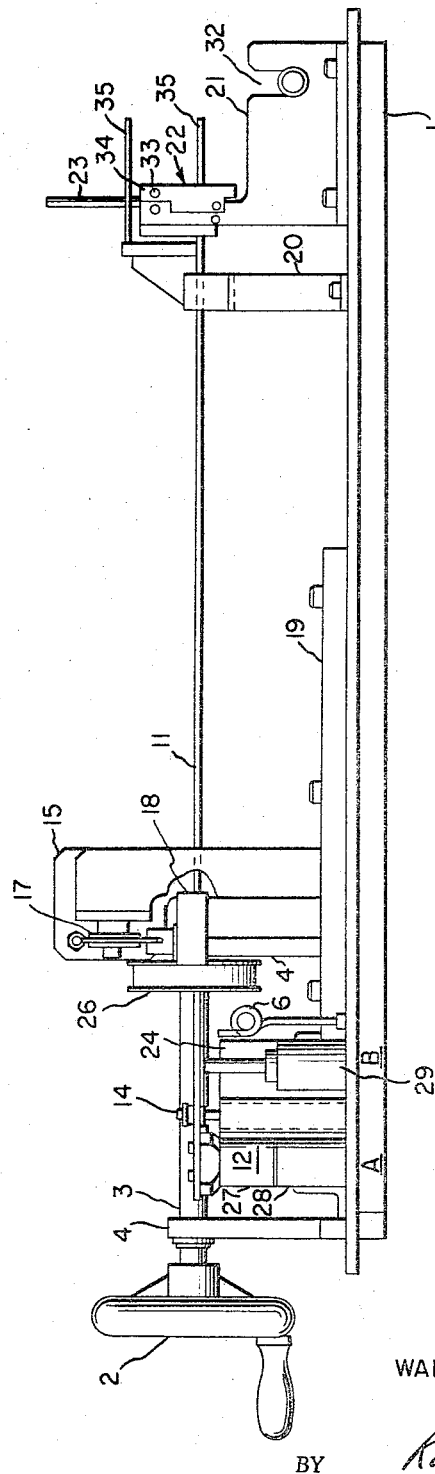
FIGURE 2 is a front elevational view.

In the drawings, the instrument is mounted on a base plate 1. A hand crank 2 is attached to one end of a rotatably movable shaft 3 which is held in position by two supports 4 mounted on base plate 1, the shaft rotating on two ball-bearings which are held in each support. An electric motor with a gear reducer arrangement can be substituted for the hand crank to power the apparatus; however, to keep the device completely portable, it is desirable to eliminate the need for outside power; therefore, the hand crank is the preferred actuating means.

A reel 26 is attached to movable shaft 3 at the opposite end thereof from crank 2. A flexible cord 5 is attached to shaft 3 adjacent reel 26, and the cord is brought around reel 26 and then through a hook 6 attached to the base plate 1, which changes the direction of pull of the cord. The cord is attached at its other end to a clip 7 which is in turn attached to the end of chart paper 8. The reel 26 is of such a diameter that when rotated upon elongating a sample of material the chart paper will advance at a rate five times that of the rate the sample being elongated. Obviously, any size reel can be used in this invention depending upon the rate in which the chart paper is to be advanced. Liquid container 24 is bolted to plate 1 and positioned with one end under shaft 3, the other end is T-shaped and extends under lever arm 11. Sample clamps 9 and 10 are positioned over the container.

Also, to the middle of movable shaft 3 a cord is attached which pulls the movable clamp 9 which holds the test specimen (test sample is not shown). The clamp 9 can be of any type, but the preferred clamp is one in which screws or bolts are used to hold the sample in place. The clamp is constructed of a corrosion resistant material such as stainless steel. The face of the clamp can be serrated to hold the test material.

The opposite sample clamp 10 is connected to lever arm 11 by a rigid hook which is attached to a pin 14 bolted through the lever arm. The pin extends down into the T portion of container 24 which allows for testing samples in liquid media by lowering the sample clamps 9 and 10.

The lever arm 11 is pivoted on the fulcrum 12 which consists of a cylinder 27 to which the lever arm is bolted, the cylinder having a pin attached on the bottom which fits into a bearing assembly in a second cylinder 28 permanently mounted to the base plate.

The fulcrum can be placed in two positions; as illustrated in the drawings the fulcrum is in position A and forms a lever of the second class and when the sample is elongated the end of the lever containing the pen 23 will move up scale on the chart 8. If the fulcrum is placed in position B by placing cylinder 27 into a third cylinder 29 permanently mounted to the base plate on the opposite side of clamp 10, a lever of the first class is formed and the instrument can be used for compression testing of samples such as is required in a puncture test.

In a puncture test, the sample is held flat and taut in a plane perpendicular to a probe which is used to puncture the film. For a puncture test, sample clamp 9 is replaced with a clamping device which holds the film as indicated above and the cord holding the clamps is replaced with a solid shaft. The probe, which can be blunt or sharp depending on the type of test desired will be permanently attached to the lever arm 11, replacing the sample clamp 10.

The lever arm 11 is kept under tension by two springs 16 which are attached to the lever arm by movable slide 18. The slide 18 fits on the lever arm, is movable and held in position by a bolt 30. The springs are the standard commercial type; the only requirements are that the springs must elongate linearly with a linear increase in force and their displacement must not exceed a maximum which depends on their position on the lever arm. The springs are fastened at one end to a cross support 15 by adjustable bolts 25 which are locked in place with a hexagonal nut and a wing nut. The top spring is attached to the slide 18 on the lever arm by a short piece of wire 31 which passes over a pulley 17 mounted on the opposite end of cross support 15 which changes the direction of the force of the spring. The lower spring is attached directly to the movable slide. The springs are in sufficient tension to be in their linear region of force-displacement behavior.

The cross support 15 is positioned in two slotted strips 19 permanently attached to the base plate. The amount of resistance or force the lever arm is subjected to can be adjusted by the tension of the springs and by the position of the cross support.

The limits of travel of the lever arm are determined by the two felt covered stops 20 which are bolted to the base plate 1 at the end of the lever arm opposite the fulcrum. The roll of chart paper is held by two chart supports 21 having slots 32 to hold the roller for the chart paper. Attached to these supports is a pen guide assembly 22 which allows pen 23 to travel freely in straight lines rather than in an arc and also reduces vibration of the pen.

Pen guide assembly 22 consists simply of four horizontal rods 33 held in place by two adjustable side supports 34 attached to supports 21. Four horizontal rods 35 extend from the end of the lever arm 11 perpendicular to rods 34 and with the aid of the four horizontal rods from the pen guide assembly 22, the pen is firmly held in place.

The pen can be of various types but the preferred one is a capillary tube ink feed, however a ball point will function also.

To make the instrument operable for testing, the pen attached to the lever arm must be brought to the zero position on the chart paper. This is simply accomplished by adjusting the tension of the two springs 16. Also, the instrument must be calibrated. Since the displacement of the lever arm is very nearly proportional to the applied force, calibration is accomplished by taking a spring of known Hookean behavior and placing the spring in the instrument of this invention and elongating the spring. Adjustments of the cross support 15, and the springs 16 are made until the desired force to move the pen full scale is obtained. The Hookean characteristics of a spring can be obtained by attaching known weights to the spring and measuring the elongation or by straining the spring in an Instron testing machine, from which a stress-strain curve is obtained.

This device is non-electrical and portable which allows it to be used in the laboratory, the pilot plant, and in production facilities to check samples immediately when removed from the process. Also, since this is a hand operated device, it allows testing to be done rapidly and is not as expensive as tests conducted on standard equipment such as an Instron. In many instances the precise and accurate measurements of the Instron are not required and a device such as the one of this invention is very practical in determining the trend established by the experiment.

Other tests can also be conducted on this machine such as stress-relaxation, creep of materials in a liquid or at elevated temperatures, heat seal or adhesive seal strength, strength of seams in materials, friction, bend resistance, compression testing, and fiber loop strength.

Another advantage of this device is that samples can be tested in liquid media thereby noting the results of the softeners, coatings, surfactants, oils, etc., on materials such as cellophane and plastic films such as polyvinyl chloride, polyethylene and polypropylene. It is also possible to study the gel strength of materials during the processes in which the gel is formed by either solvent extraction gelation or coalescence. Another advantage is that the amount of liquid needed for testing in this device is relatively small compared to the standard equipment such as an Instron which requires 10 liters of liquid whereas the present instrument only requires approximately 200 cc. of liquid.

It is also possible to test samples under other temperature conditions. This can be accomplished by either placing the entire device in the high or low temperature medium or by enclosing the sample area and subjecting it to a high or low temperature. If the temperature is caused to vary in a controlled fashion, thermal transitions and shrinkage or expansion characteristics of the sample can be determined.

It is also possible to measure the peel strength of heat seals and laminates and it is possible to do this in a liquid medium. Other properties of film such as slip friction and creep can also be measured by making the necessary adaptions to conduct these tests. The tester is applicable to a variety of shapes such as films, fibers, fabrics, plastics, paper, and cardboard.

What is claimed is:

1. An instrument for testing materials comprising: a base plate; supports mounted on said plate; a shaft rotatably mounted through said supports having a reel attached to one end thereof and drive means cooperatively attached to the other end of said shaft adapted to rotate said shaft; a lever arm parallel to said shaft, said lever arm pivoted near one end on a fulcrum and having a writing instrument attached at the opposite end; tensioning means cooperatively associated with said lever arm intermediate said fulcrum and said writing instrument for adjusting the extent of the stress load placed on the lever arm; sample clamps mounted between said shaft and said lever arm, one clamp flexibly attached to said shaft and the other clamp rigidly attached to said lever arm at a point adjacent the fulcrum; and means for supporting a recording chart under said writing instrument and connecting means secured to said reel and adapted to be secured to said recording chart for advancing said chart proportionally to the movement of said reel upon rotating said shaft.

2. The instrument of claim 1 wherein a liquid holding container is positioned under the sample clamps.

3. The instrument of claim 1 wherein the lever arm is a lever of the second class.

4. The instrument of claim 1 wherein the lever arm is a lever of the first class.

5. An instrument for testing materials comprising: a base plate; supports mounted on said base plate; a crank actuated shaft rotatably mounted through said supports; a reel attached to the end of said shaft opposite said crank; a lever arm of the second class pivotably mounted at one end on said base plate parallel to said shaft; a writing instrument fixedly attached to the end of said lever arm opposite the pivot; two sample clamps mounted between said shaft and said lever arm, one clamp flexibly attached to said shaft and the other clamp rigidly attached to said lever arm adjacent the pivot; two slotted strips mounted on said base plate parallel to and on opposite sides of said lever arm; a cross support mounted in said slots and adapted to be moved to positions along said lever arm intermediate said pivot and said writing instrument; a movable slide mounted on said lever arm; two springs adjustably attached to one end of said cross support, the opposite ends of said springs attached to said movable slide whereby the lever arm is kept under tension; and means for supporting a recording chart under said writing instrument and connecting means secured to said reel and adapted to be secured to said recording chart for advancing said chart proportionally to the movement of the clamp attached to said shaft.

6. The instrument of claim 5 wherein said recording chart advances at a rate five times the rate of said sample clamp attached to said shaft.

References Cited by the Examiner

UNITED STATES PATENTS

| | | | |
|---|---|---|---|
| 1,991,854 | 2/1935 | Johnson | 73—95 X |
| 2,185,340 | 8/1940 | Howe | 73—95 X |
| 3,049,916 | 8/1962 | Weiner | 73—95 |

JAMES J. GILL, *Acting Primary Examiner.*

RICHARD QUEISSER, *Examiner.*

J. W. MYRACLE, *Assistant Examiner.*